UNITED STATES PATENT OFFICE.

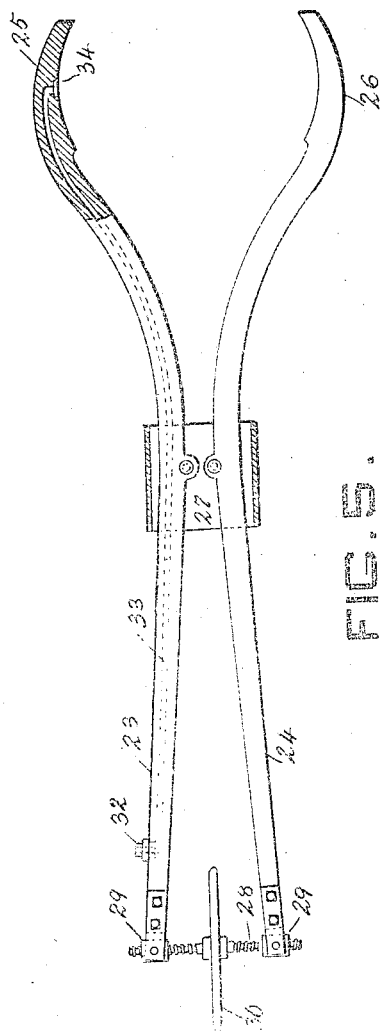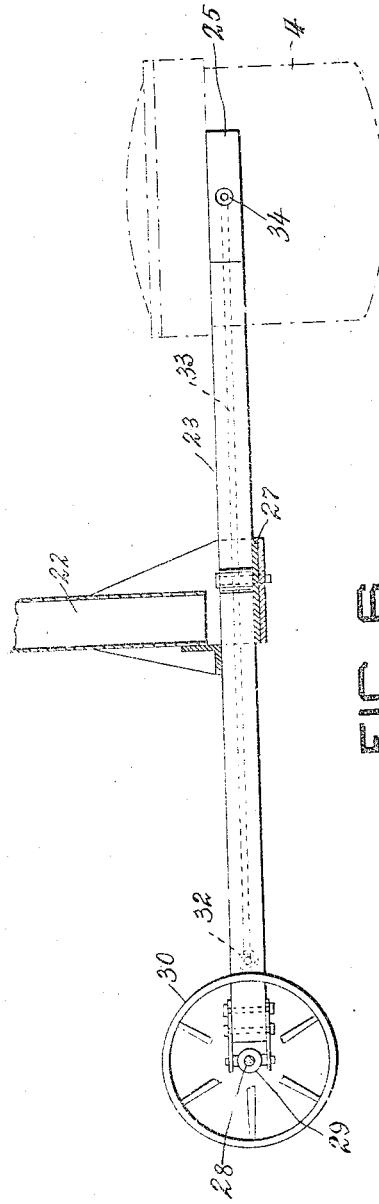

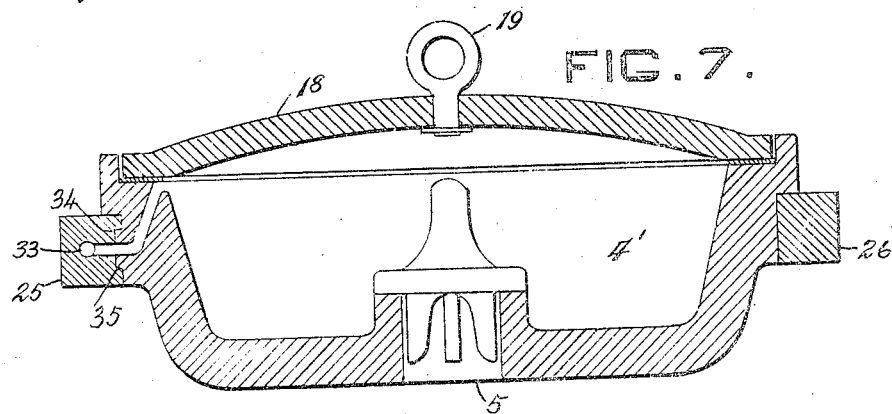
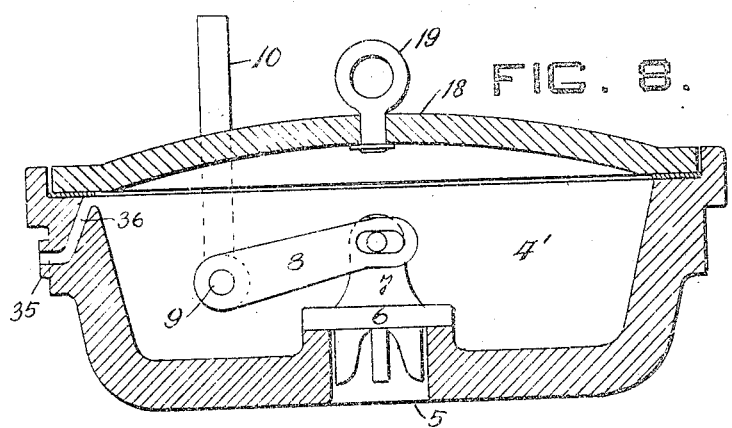
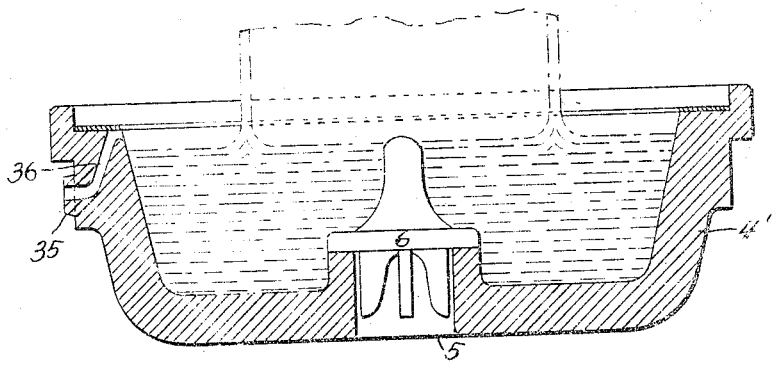

JAMES A. CHAMBERS, OF PITTSBURGH, PENNSYLVANIA.

APPARATUS FOR THE MANUFACTURE OF GLASS.

1,232,494. Specification of Letters Patent. Patented July 10, 1917.

Application filed May 1, 1916. Serial No. 94,584.

*To all whom it may concern:*

Be it known that I, JAMES A. CHAMBERS, of Pittsburgh, in the county of Allegheny and State of Pennsylvania, have invented certain new and useful Improvements in Apparatus for the Manufacture of Glass, of which the following is a full, clear, and exact description, reference being had to the accompanying drawings, forming part of this specification, in which—

Figure 1:
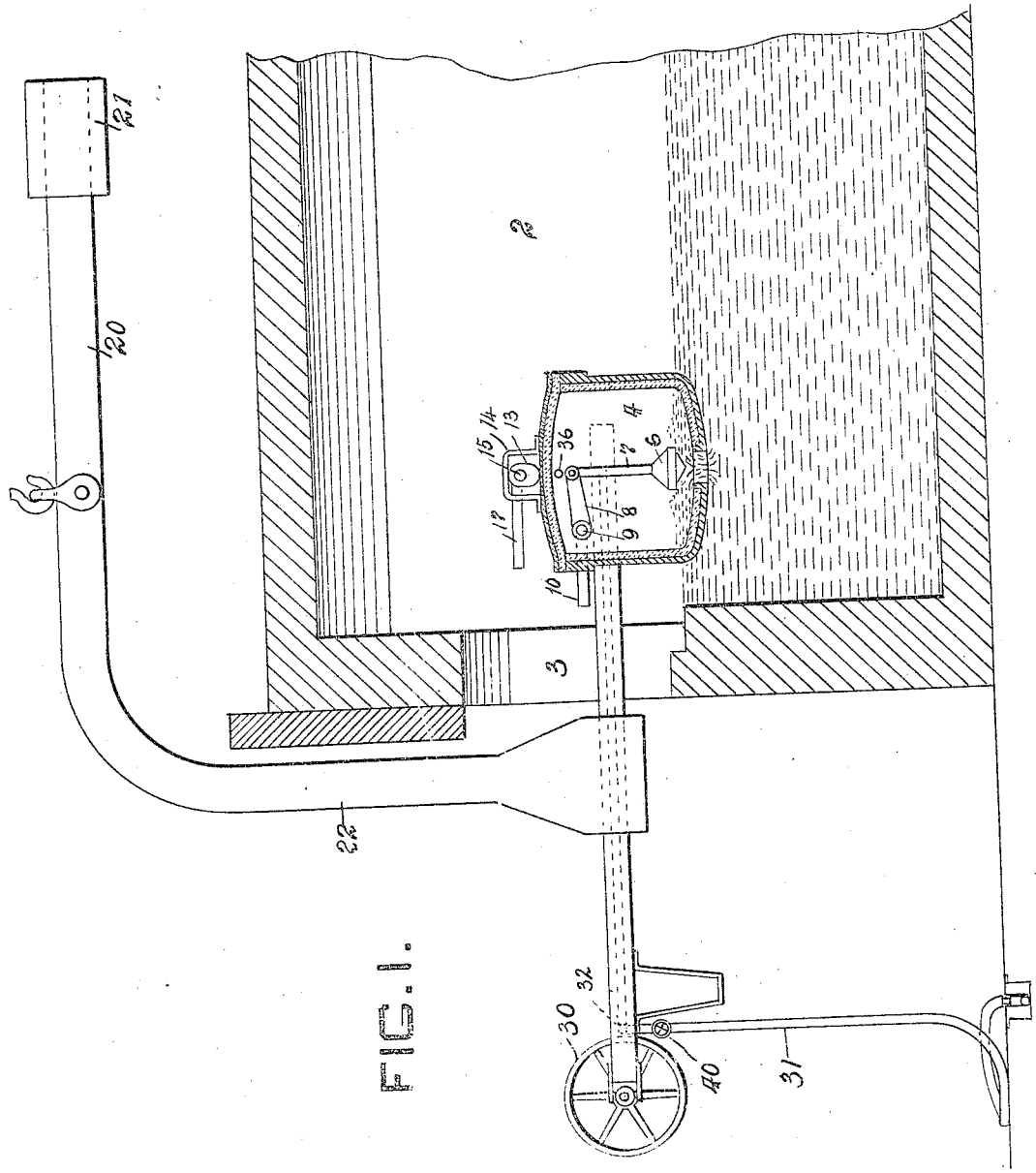
Figure 2:
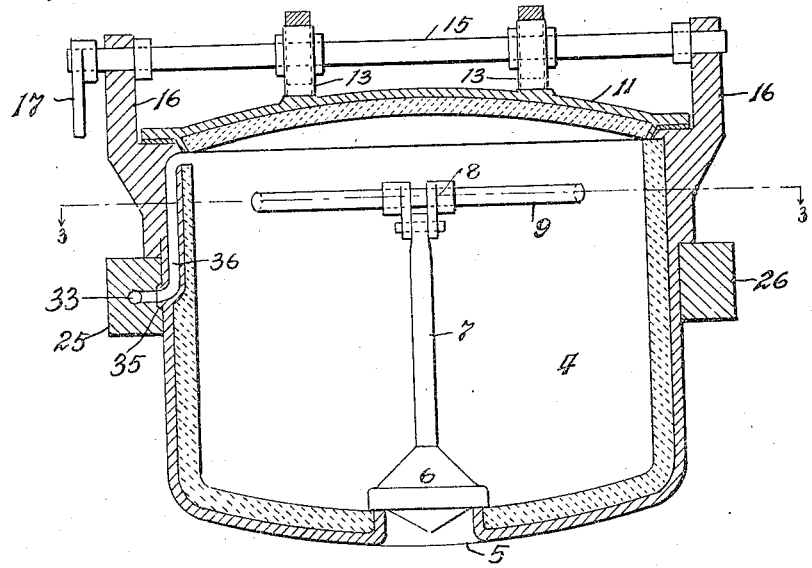
Figures 3, 4:
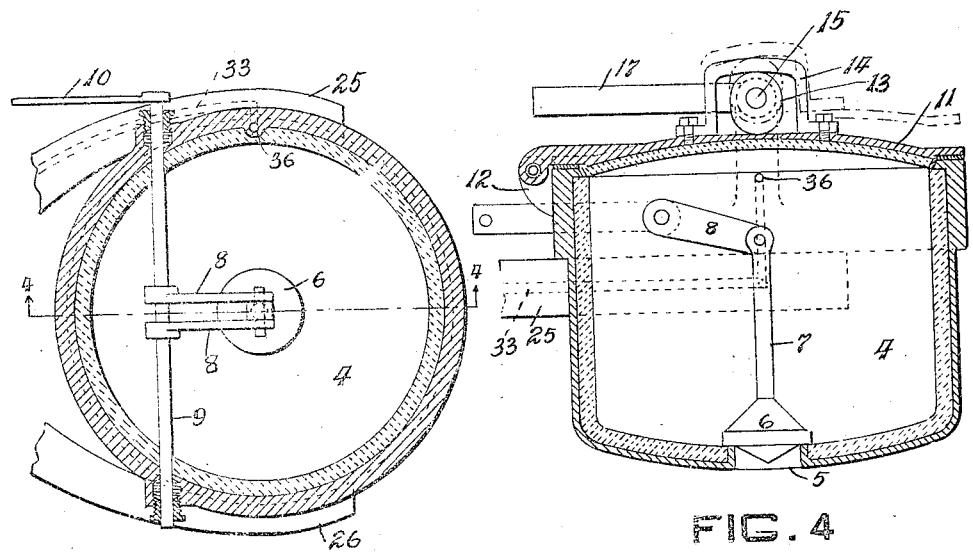

Figure 1 is a vertical sectional view of a portion of a tank furnace, a pot or ladle for taking molten glass from the furnace, and a side elevation of the crane and tongs for manipulating the pot; Fig. 2 is an enlarged vertical sectional view of the pot or ladle in the grasp of the tongs; Fig. 3 is a horizontal sectional view of the same, on line 3—3 of Fig. 2; Fig. 4 is a vertical sectional view on the line 4—4 of Fig. 3; Fig. 5 is a plan view of the tongs; Fig. 6 is a vertical sectional view on the line 6—6 of Fig. 5; Fig. 7 is a vertical sectional view of a modified form of pot used in drawing window glass; Fig. 8 is a like view, the pot being provided with valve operating mechanism; and Fig. 9 is a view similar to Fig. 7, the lid being removed to illustrate the drawing of glass from the pot.

My invention relates to apparatus by means of which molten glass may be taken from a tank furnace by suction and poured or cast into a mold, or on a table, or drawn into cylinders, in the manufacture of glass articles, plate glass, and window glass; and it consists in a pot or ladle adapted to contain molten glass, and having a valve for the admission of the glass, a detachable supporting device having devices for applying suction to the interior of the pot or ladle, and in details of construction, as is hereinafter described.

In the drawing 2 represents a portion of a continuous glass melting glass furnace having a door-way 3 through which the pot or ladle may be brought within and withdrawn from the furnace, and 4 represents a pot or ladle for collecting and containing the molten glass. This pot, which is adapted for use in the manufacture of plate glass, may be composed of clay, or other refractory material, or of metal, or it may be partly clay and partly metal, as is shown in the drawings where an outer steel shell is provided with a lining of clay. In the bottom of the pot 4 is a port 5, having a valve 6, which may be provided with a stem 7 which is pivoted at its upper end to the outer ends of the arms 8 which are keyed to the horizontal shaft 9. Keyed to the shaft 9, outside of the pot 4, is the lever arm 10.

The lid 11 of the pot 4 may be hinged to a lug 12 extending from the pot, and it may be secured on the pot by the cams 13 located in the yokes 14 and keyed to the shaft 15, which shaft is journaled in the arms 16, projecting from the pot, and it is operated by the lever 17. In the modification shown in Figs. 7 and 8 the lid 18 is without fastenings and it is adapted to be lifted from the pot by the eye 19.

In Figs. 7, 8, and 9 the pot 4' is shallow, adapted to use in the manufacture of glass articles in molds, and to the manufacture of window glass, the molten glass being drawn directly from the pot, as indicated by dotted lines in Fig. 9, after the pot has been placed on a heating kiln, such as is ordinarily employed for maintaining the glass at the proper drawing temperature. In the manufacture of glass articles in molds the molten glass may be cast either through the port 5 or by pouring over the rim of the pot.

The tongs and crane for supporting the pots 4 and 4' in the manipulation of the same are shown or indicated in Figs. 1, 2, 3, 5, 6, and 7. The crane may be of any suitable form, but as shown in the drawing it consists of a horizontal arm 20 supported by a hook and chain from any suitable traveling device, and having a counterweight 21, and a vertical arm 22 on the lower end of which the tongs are supported. These tongs comprise two arms, 23 and 24, at the outer ends of which are the jaws 25 and 26 adapted to grasp the pot, the arms being pivoted to a plate 27 which rests on the base plate of the crane. At the inner end of the arms is a screw 28, which meshes with the threaded nuts 29 pivoted in the arms 23 and 24, and is operated by a hand wheel 30.

Leading from any suitable apparatus for producing suction, is a flexible tube 31, which is adapted to be coupled with the coupling 32, which coupling communicates with an air channel 33 in the arm 23 of the tongs, which leads to a cupped opening 34 in the grasping face of the jaw 25. This opening 34 is adapted to register with a nozzle 35 formed on the side of the pots 4 and 4'. In the wall of these pots is an air channel 36 which communicates with the nozzle 35 and the interior of the pots.

The operation is as follows: The pot 4 having been heated, and the cover 11 having been placed on the pot, it is grasped by the tongs, the opening 34 registering with the nozzle 35, the pot is introduced into the furnace 2 and lowered until the bottom of the pot is below the surface of the molten glass, as is indicated in Fig. 1 of the drawings. The air is then drawn from the interior of the pot by the suction apparatus, through the channel 36 in the pot and the channel 33 in the tongs, and the valve 6 is opened, either by the lever arm 10 or by the pressure of the molten glass in the furnace, and the molten glass flows into the pot through the port 5. When the pot has received the desired quantity of molten glass, the suction is shut off by the valve wheel 40, the valve 6 is closed, either by the lever arm 10 or by the pressure of the glass in the pot, and the pot containing the molten glass is taken by the tongs, or by other devices, either to a refining furnace or directly to the mold, to the drawing kiln, or to the casting table. Where the molten glass is to be cast in the manufacture of plate glass or glass articles, the casting may be performed either through the port 5, the valve 6 being opened to allow of the flow of the glass, or it may be poured from the pot in the usual manner. In the manufacture of window glass, the pot is taken to the drawing kiln, the cover 11 is removed and the glass is drawn into cylinders, as is indicated in Fig. 9.

The advantages of my invention should be appreciated from the foregoing description by those skilled in the art.

Having thus described my invention what I claim and desire to secure by Letters Patent is

1. In apparatus for the manufacture of glass, a ladle or pot having a glass receiving inlet port, a valve adapted to move with the pressure of the molten glass, and devices for connecting the pot with suction devices.

2. In apparatus for the manufacture of glass, a ladle or pot having a glass receiving inlet port, a valve adapted to move with the pressure of the molten glass, and devices for operating the valve, the pot being adapted to be connected with a suction device.

3. In apparatus for the manufacture of glass, a ladle or pot having a removable cover, a glass receiving port in the bottom of the ladle, and an air exhaust channel passing through the side wall thereof adjacent the upper edge, in combination with tongs adapted to grasp and support the pot and having an air exhaust channel adapted to be brought into communication with the air exhaust channel of the pot.

In testimony whereof, I have hereunto set my hand.

JAMES A. CHAMBERS.

Witnesses:
    JAMES K. BAKEWELL,
    ANNA K. BEATTY.